…

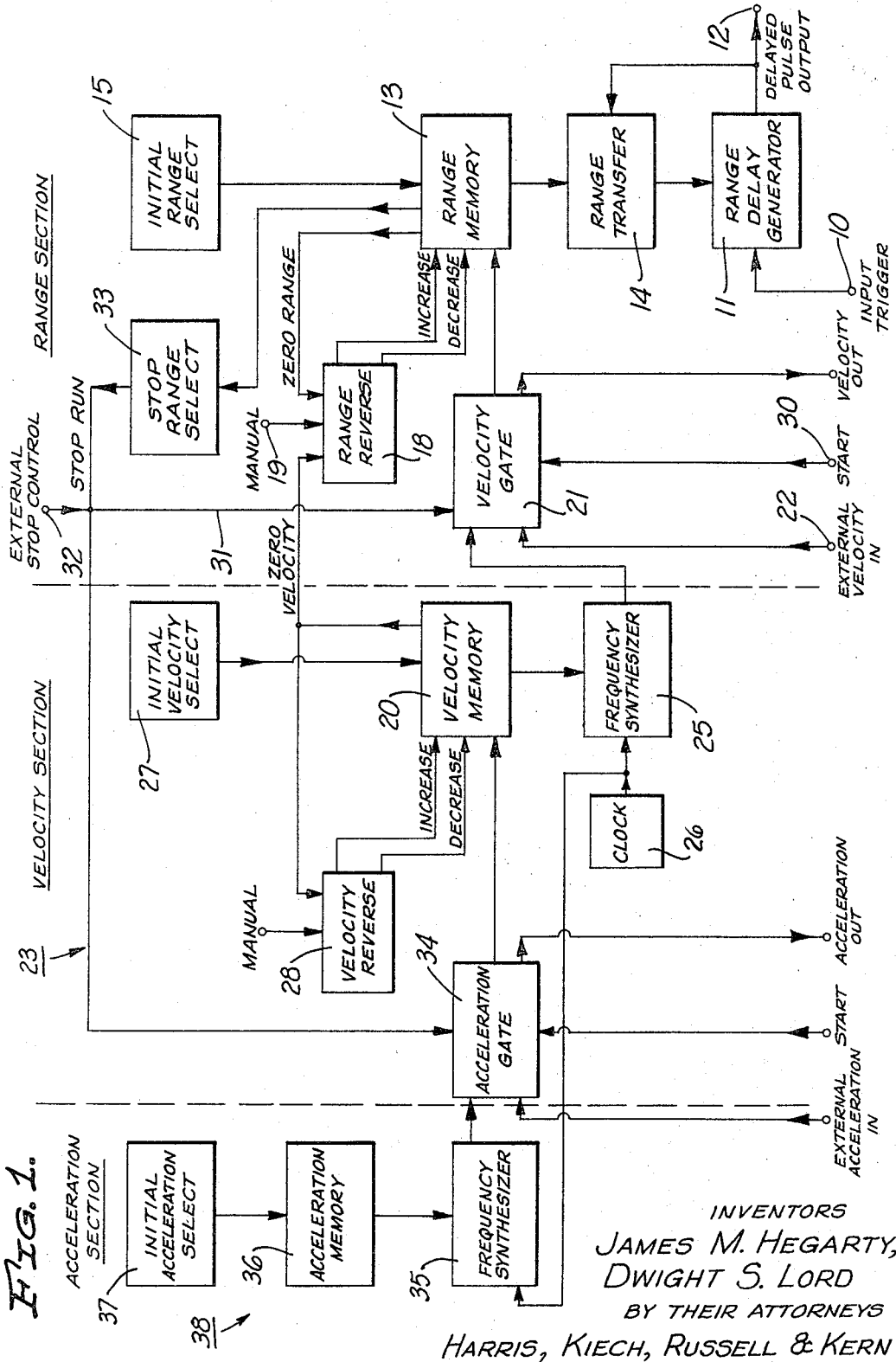

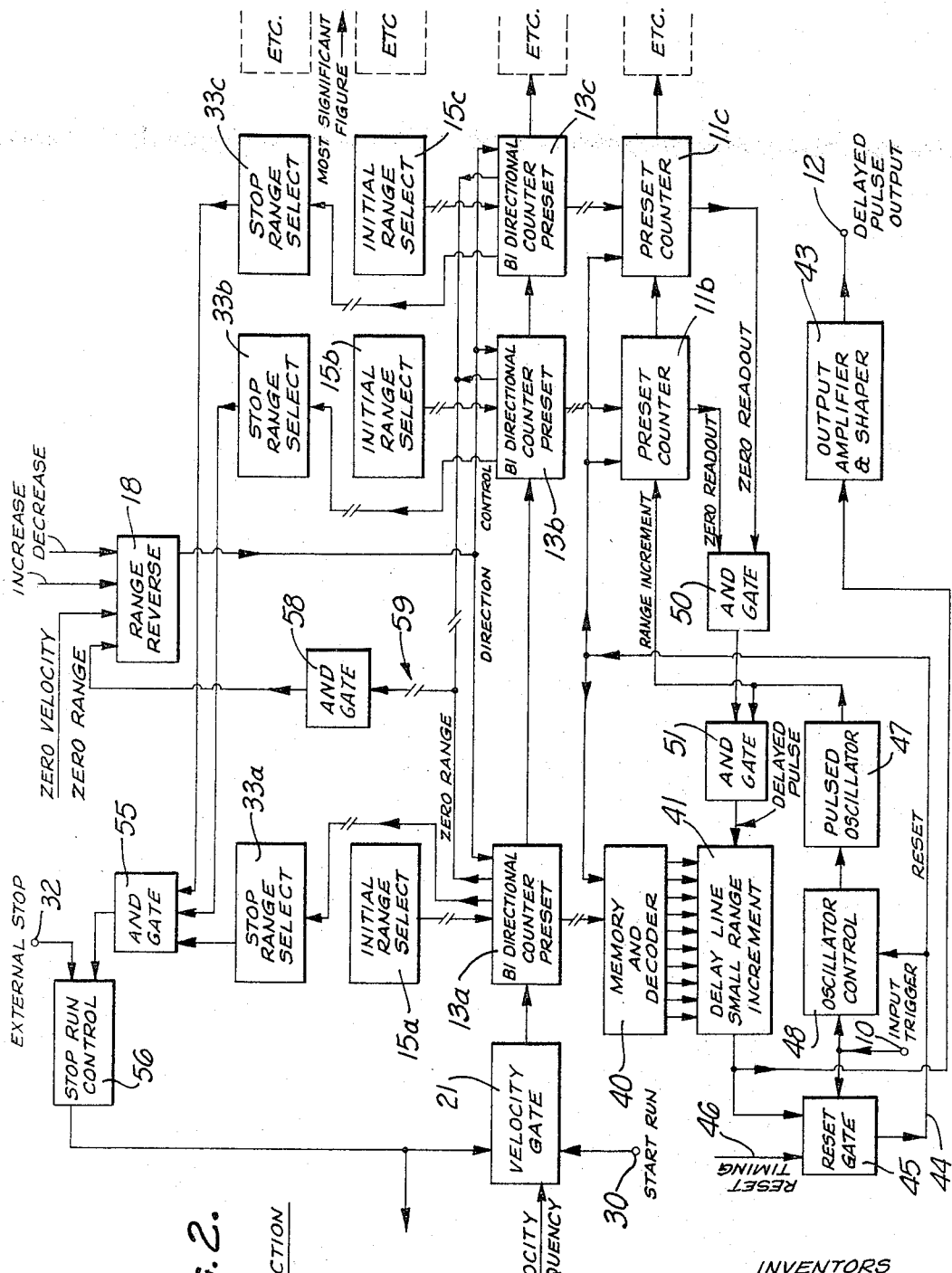

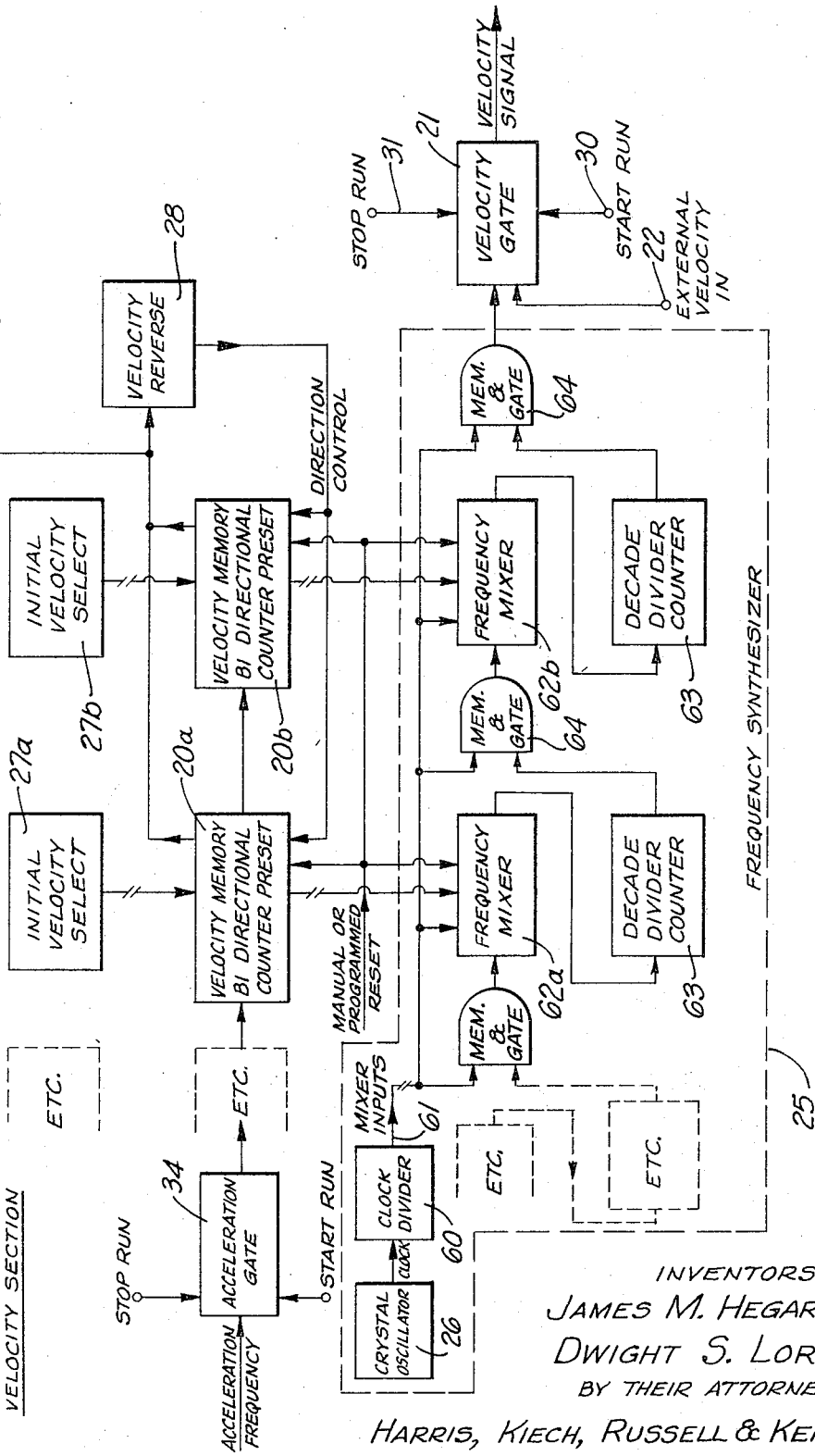

United States Patent Office 3,323,123
Patented May 30, 1967

3,323,123
RANGE SIMULATOR FOR PROVIDING A CONTROLLED DELAY BETWEEN AN INPUT TRIGGER AND AN OUTPUT PULSE
James M. Hegarty, Alhambra, and Dwight S. Lord, Redondo Beach, Calif., assignors to Rutherford Electronics Co., El Segundo, Calif., a corporation of California
Filed Sept. 27, 1965, Ser. No. 490,429
9 Claims. (Cl. 343—17.7)

This invention relates to devices suitable for simulating radar range and the like and, more particularly, to a device which provides a controlled delay between an input trigger and an output pulse.

It is an object of the invention to provide a new and improved delay device which will introduce a controlled delay between an input and an output. A further object is to provide such a device which may be used with inputs which are cyclical and with inputs which are random in nature. An additional object is to provide such a device in which the magnitude of delay can be reproduced exactly and can be varied if desired, with a variety of functions.

It is an object of the invention to provide such a device which may be used to simulate the output of a radar receiver for use in testing other portions of a radar and/or for use as a substitute for a radar in a variety of systems which utilize radar information as an input. An additional object is to provide such a device which can be used to simulate a radar target with varying range, velocity and/or acceleration. A particular object is to provide such a device in which the parameters can be programmed to vary in a predetermined manner and in which the variation of parameters is reproducible for repetitive operations.

It is an object of the invention to provide a range simulator for radar or the like utilizing digital control for the parameters and one in which the initial and final conditions can be preset in digital form manually or remotely or under computer control. An additional object of the invention is to provide such a device in which the only variable is the clock rate which can be a crystal controlled oscillator for maximum accuracy and repeatability.

It is an object of the invention to provide a device for simulating radar range or the like by providing a controlled delay between an input trigger and an output pulse and including means for generating the output pulse at a predetermined period of time after receiving the input trigger with such means including delay digital counter means with the predetermined period being a function of the preset state of the delay counter means, memory means for storing a count in digital form and including memory digital counter means, reset means for presetting the delay counter means to the count in the memory counter means after generation of an output pulse, and means for varying the count in the memory counter means. An additional object is to provide such a device wherein the count in the memory counter means is controlled by a pulse source which varies as a function of the desired change of range. A further object of the invention is to provide such a device wherein the memory counter means are bidirectional providing for an increase and a decrease in delay as desired.

It is a further object of the invention to provide such a device including additional memory means for storing a count in digital form with additional memory digital counter means, means for varying the count in the additional memory counter means, means for coupling the count state of the additional memory counter means to the pulse source as the digital input for varying the frequency of the pulse source, and means for coupling the pulse source to the initial memory means for varying the count in the initial memory counter means. Another object of the invention is to provide such a device which may incorporate any number of such additional pulse sources and associated equipment as desired.

The invention also comprises novel details of construction and novel combinations and arrangements of parts together with other objects, advantages, features and results, which will more fully appear in the course of the following description. The drawings merely show and the description merely describes a preferred embodiment of the present invention which is given by way of illustration or example.

In the drawings:
FIG. 1 is a diagram illustrating the over-all system;
FIG. 2 is a diagram illustrating the range section of FIG. 1 in greater detail; and
FIG. 3 is a diagram illustrating the velocity section of FIG. 1 in greater detail.

Referring to FIG. 1, the input trigger signal which is to be delayed is coupled into the device at terminal 10 as the input to a range delay generator 11. At a predetermined time after receipt of the input trigger, the generator 11 provides the delayed pulse output at terminal 12. The magnitude of the delay can be preset to any time or its equivalent range, within the operating range of the particular instrument. In a typical system, the range may be varied from 0 feet to 999,999 feet in steps of 1 foot. The magnitude of the delay is stored in a series of counters in a range memory 13. The output pulse from the delay generator 11 also actuates a range transfer unit 14 to transfer the information from the memory 13 to the generator 11 for use with the next input trigger.

The initial count state of the counters of the range memory 13 is set by an initial range select unit 15. The initial range select unit 15 may comprise a series of manual switches for direct setting of the initial delay of the range generator or alternatively may comprise a series of remotely controlled switches or a decoder and transfer unit or other appropriate mechanism for a remotely controlled or remotely programmed setting.

The counters of the range memory 13 preferably are bidirectional counters permitting an increase and a decrease in range as desired. The direction of count is controlled by a range reverse unit 18. The direction of count and hence the direction of range change may be set by a manual or remote input at terminal 19. The direction of count is also controlled by a zero range signal from the range memory 13 and by a zero velocity signal from a velocity memory 20.

The range memory is changed by having the counters thereof count pulses from a pulse source coupled via a velocity gate 21. A change in the count state of the range memory will produce a change in the magnitude of the delay at the delay generator and will simulate a change in range or velocity. The pulse input to the range memory may be provided from an external source at a terminal 22 or from the velocity section indicated generally at 23.

The pulse source may comprise a frequency synthesizer 25 driven from a clock unit 26, the latter typically being a crystal controlled oscillator. A number of frequency synthesizers suitable for use are currently available. A preferred form is shown in our copending application Ser. No. 490,430 entitled "Frequency Synthesizer" and filed the same day as this application, now Patent No. 3,293,561. The frequency synthesizer provides a pulse output at a controlled rate and in the embodiment illustrated, is controlled by the velocity memory unit 20. In the velocity section, the velocity memory 20, the initial velocity select unit 27 and the velocity reverse unit 28 correspond to and may be identical to the range memory 13, the initial range select unit 15 and the range reverse unit 18 of the range section.

The pulse output from the velocity section is controlled by the gate 21 which is opened by a start signal at terminal 30. Typically the start signal is generated externally as by a manual switch but could be generated internally by a conventional timing circuit if desired. The velocity gate 21 is closed by a stop signal on line 31 for terminating a velocity run. The stop signal may be produced externally and coupled in at a terminal 32 or can be generated internally by a stop range select unit 33. The stop range select unit 33 may be similar to the initial range select unit 15 in that it may be a manually set or remotely set series of switches or gates which provide a stop run output pulse when the desired range is reached. The frequency synthesizer is operable to provide any one of a wide range of output frequencies, with the selected frequency being controlled by the setting of the velocity memory 20. The velocity memory may incorporate a series of bidirectional counters energized from another pulse source via an acceleration gate 34 permitting the count state to be increased or decreased depending upon the direction of count when an input signal is applied to the velocity memory counters, thus simulating a change in velocity, i.e. acceleration or deceleration.

An acceleration section 38 may be provided identical to the velocity section 23 incorporating another frequency synthesizer 35, an acceleration memory unit 36, and an initial acceleration select unit 37. The system can be extended by incorporation of additional sections corresponding to the velocity and acceleration sections so as to add other derivatives of distance or to vary either velocity or acceleration by other functions. The so-called "jerk" function can be obtained by addition of one more section to produce a decrease or increase in acceleration. In the operation of the system it should be noted that the start controls for all of the gates can be operated at the same time or can be operated at different times as desired. Similarly, the stop controls for the various gates can be operated at one time or at various times.

As an example of a typical run, the initial range select unit 15 may be set at 50,000 feet and the stop range select unit 33 may be set at 2,000 feet. The initial velocity select unit 27 may be set at 300 feet per second. The input trigger rate may be in the order of 1,000 pulses per second. The acceleration is set to zero since there is to be no velocity change in this run. At the start of the run, the velocity gate 21 is opened. The initial delay produced by the delay generator 11 will be $50,000 \times 2.03344 \times 10^{-9}$ seconds or 101.672 microseconds, corresponding to a target distance of 50,000 feet. The range reverse unit 18 will be set to decrease the count state of the range memory 13 so that the pulse output from the velocity section will cause the range memory counters to count in a decreasing delay direction. The count state from the range memory will be transferred to the delay generator after generation of an output pulse and at a time sychronized with the operation of the range memory counters so that transfer does not occur when a count is occurring. The decrease in range at the range memory unit 13 will continue until it arrives at a value corresponding to a 2,000 foot range at which time an output is provided from the stop range select unit 33 closing the velocity gate. The elapsed time from the start to the end of the run will be 160 seconds. This stop run signal may also be utilized to turn off the entire device and to reset it to the initial condition and to initiate another run if desired.

Velocity change may be introduced in a run in the same manner, by appropriately setting the initial acceleration select unit 37 and appropriately opening and closing the acceleration gate 34. Acceleration changes may be introduced by connecting the appropriate pulse source to the acceleration memory unit 36 to change the count state thereof.

The range section is shown in greater detail in FIG. 2. The bidirectional counters of the range memory 13 are indicated as 13a, 13b, 13c, etc., there being a counter for each decade of the system. There is an initial range select unit for each decade, indicated at 15a, 15b, 15c, etc., and a stop range select unit for each decade indicated at 33a, 33b, 33c, etc. The range delay generator 11 includes a separate component for each decade and in the embodiment illustrated has a memory and decoder 40 and delay line 41 for the least significant figure and preset counters 11b, 11c, etc., for the remaining decades. The memory and decoder 40 and delay line 41 are utilized to provide very small increments such as one foot or less, being more economical than the counter at this small increment. It should be noted that the memory and delay line are not essential to the operation of the invention and preset counters can be used throughout the range delay generator if desired. The term preset counter generally indicates any counter which can be controlled to provide a predetermined count. The counter could be electronic or mechanical, digital or analog. Even a count pick-off system is applicable, but an electronic digital counter is preferred in most present-day applications. In an alternative arrangement, an analog delay unit can be controlled by a voltage such as in a phanastron, with the voltage produced from binary coded decimal input through resistors.

The delayed output pulse appears at the output of the delay line 41 and is connected to the terminal 12 through an amplifier and pulse shaper 43. The delayed output pulse is also gated onto a reset line 44 through a reset gate 45. The timing of the reset gate is controlled by a reset timing signal on line 46 so that the reset pulse on line 44 is produced when the memory counters are not counting. Typically this may be performed by resetting on the noncounting half cycle of a count pulse.

The reset pulse on the reset line 44 functions to turn off a pulse oscillator 47 via an oscillator control unit 48 and also functions to reset the memory 40 and counters 11b, 11c, etc. to the initial state. The next input trigger pulse at the terminal 10 functions to turn on the pulse oscillator 47 through the control 48 and also operates through the reset gate 45 to set the memory 40 and the counters 11b, 11c, etc. to the thin state of the memory counters 13a, 13b, 13c, etc., with this transfer being controlled by the reset timing also. The output of the oscillator 47 is coupled to the input of the first counter 11b of the series of preset counters, with the output of the first serving as the input to the next counter, etc. Each input pulse to the counter 11b represents a given range increment.

The preset counters 11b, 11c, etc., are capable of being set to any given count state and the complement of the desired range is set therein by transfer from the memory counters. The initial range information set into the range select units 15a, 15b, 15c maintains the corresponding bidirectional counters 13a, 13b, 13c in the count state selected until a velocity of acceleration is desired. The count state from the memory counters is transferred to the preset counters of the delay generator when an input trigger is received. The preset counters 11b, 11c begin counting the output of the oscillator 47 and when zero readout for all of the preset counters is reached, an output is obtained from the AND gate 50. The AND gate 51 in turn switches the output of the oscillator 47 into the delay line 41 which functions as a small range increment section. Only one pulse from the oscillator 47 enters the delay line, since this same pulse produces a count in the preset counter 11b and closes the gates 50 and 51. The length of the delay line 41 is controlled by selecting various lengths of line as a function of the position of memory flip-flops in the memory and decoder units 40, these flip-flops being initially set and controlled by the bidirectional counter 13a.

As described earlier, the output from the delay line is the desired delayed output pulse which is coupled to the output amplifier 43 and to the reset gate 45.

The outputs from the stop range select units 33a, 33b, 33c, etc., are connected to an AND gate 55 for providing an input to the stop run control unit 56. The desired stop range point may be determined by setting a series of front panel switches and is used to terminate a velocity or acceleration run by closing the velocity or acceleration gates. When a pulse signal is introduced through the velocity gate 21, the bidirectional counters 13a, 13b, 13c count the incoming signal, with the direction of count being controlled by the range reverse unit 18.

An output is also taken from the memory counters 13a, 13b, 13c for the stop range select units 33a, 33b, 33c so that when there is coincidence between the selected stop range and the actual range, a stop signal is generated for each range select unit. When there is a corresponding signal from each of the range select units, the velocity gate 21 will be closed via the AND gate 55 and stop run control 56 thereby preventing additional input signals to the bidirectional counters of the memory. This permits the setting of the length of a run by means of front panel manual controls or by means of remotely programmed inputs.

The direction of range change in response to a pulse signal through the velocity gate 21 is controlled by the range reverse unit 18. This may be manually set to increase or decrease and may also be set to change when the range goes through zero and when the velocity goes through zero. A signal indicating zero range is provided from each of the memory counters, 13a, 13b, 13c to AND gate 58 with a zero signal from each of the gates resulting in a range reverse input signal to the unit 18. A similar control signal may be obtained from the velocity section. In the diagram of FIGS. 2 and 3, the symbol indicated at 59 is utilized to indicate parallel transfer of binary coded decimal information on a plurality of parallel lines and is used herein in order to simplify the drawing.

It should be noted that the equipment is not limited to the particular number of counters and decades illustrated herein and that the range can be extended to any given distance by the utilization of additional decades in the memory and delay generator and associated equipment. The velocity and acceleration variations are similarly selectable by utilization of appropriate frequencies and the number of counters.

The velocity section of the system as illustrated in FIG. 1 is shown in greater detail in FIG. 3. The acceleration section and other higher derivative sections may be identical to the velocity section as described herein.

Coupling of the velocity signal to the range section memory is controlled by the velocity gate 21. The velocity signal may be provided from an external source at terminal 22 or from the frequency synthesizer 25.

In the frequency synthesizer illustrated herein, the output of a precise crystal oscillator 26 is divided in a digital-type divider counter 60 to provide a plurality of different frequencies on the mixer input lines indicated at 61. Various of these input frequencies are selected and combined under the control of the velocity memory counters 20a, 20b, etc., to provide an output signal as an input to the velocity gate. The clock divider 60 provides frequencies having the ratio of 1, 2, 4, 2. This permits mixing so that outputs having multiples of 1 through 9 can be obtained. The determination of which of these frequencies are mixed is controlled by the state of the velocity memory counters which are bidirectional in nature with the initial state being preset by the initial velocity select units 27a, 27b, etc. Each memory counter controls the input frequencies to a corresponding mixer 62a, 62b, etc. The output of each mixer is coupled to a decade divider counter 63 with the output of the decade being connected as the input to the next mixer or to the velocity gate by a memory and gate unit 64. The output of a decade divider counter is mixed with the other frequencies selected by the memory counter in a particular mixer to provide the input to the next decade divider counter. This process may be repeated as often as desired until the number of desired significant figures is achieved.

In the particular frequency synthesizer illustrated, the mixer contains only a nine count leaving the tenth count period available for transfer from the previous decade counter into the next mixer so that insertion from a decade counter does not interfere with the frequency inputs from the divider 60. For a more complete description of the frequency synthesizer, reference may be had to our aforementioned copending application.

When a constant velocity run is desired, the desired velocity is set in the initial velocity select units 27a, 27b, and the acceleration select units 37 are set to zero or the acceleration gate 34 is maintained closed. The velocity memory counters 20a, 20b will remain at the initial state and the frequency of the output to the velocity gate will be constant. If a change in velocity is desired, a pulse signal may be introduced through the acceleration gate 34 for counting in the memory counters, in the same manner as occurs in the range section. This will produce a change in frequency of the signal at the velocity gate which corresponds to a change in velocity. The direction of velocity change is controlled by the velocity reverse unit 28 which may be manually set or externally programmed as desired. The velocity reverse unit 28 also provides for reversal of direction of count of the memory counters when the velocity signal goes through the zero velocity value, in a manner similar to that utilized in the range section. In an apparatus which does not require any velocity change function, the initial velocity select units can be utilized to provide a fixed input to the synthesizer and the bidirectional counters could be omitted. In most embodiments of the device of the invention, this arrangement would be utilized with the highest derivative section whether it be the velocity section, the acceleration section, the jerk section or otherwise.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

We claim as our invention:

1. In a device for simulating radar range or the like by providing a controlled delay between an input trigger and an output pulse, the combination of:
   means for generating an output pulse at a predetermined period of time after receiving an input trigger and including delay digital counter means with said predetermined period being a function of the preset state of said delay counter means;
   memory means for storing a count in digital form and including memory digital counter means;
   reset means for presetting said delay counter means to the count in said memory counter means after generation of an output pulse; and
   means for varying the count in said memory counter means.

2. In a device for simulating radar range or the like by providing a controlled delay between and input trigger and an output pulse, the combination of:
   means for generating an output pulse at a predetermined period of time after receiving an input trigger and including delay digital counter means with said predetermined period being a function of the preset state of said delay counter means;
   memory means for storing a count in digital form and including memory digital counter means;
   reset means for presetting said delay counter means to the count in said memory counter means after generation of an output pulse;
   first means for setting the count in said memory counter means to an initial count;
   a pulse source; and
   second means for coupling said pulse source to said memory means for varying the count in said memory counter means.

3. In a device for simulating radar range or the like by providing a controlled delay between an input trigger and an output pulse, the combination of:
- means for generating an output pulse at a predetermined period of time after receiving an input trigger and including delay digital counter means with said predetermined period being a function of the preset state of said delay counter means;
- memory means for storing a count in digital form and including bidirectional memory digital counter means;
- reset means for presetting said delay counter means to the count in said memory counter means after generation of an output pulse;
- first means for setting the count in said memory counter means to an initial count;
- a pulse source;
- second means for coupling said pulse source to said memory means for varying the count in said memory counter means; and
- reverse means for selecting the direction of count variation in said memory counter means.

4. In a device for simulating radar range or the like by providing a controlled delay between an input trigger and an output pulse, the combination of:
- means for generating an output pulse at a predetermined period of time after receiving an input trigger and including delay digital counter means with said predetermined period being a function of the preset state of said delay counter means;
- first memory means for storing a count in digital form and including first memory digital counter means;
- reset means for presetting said delay counter means to the count in said first memory counter means after generation of an output pulse;
- means for setting the count in said first memory counter means to an initial count;
- a pulse source for producing pulses at a controlled frequency as a function of a digital input;
- second memory means for storing a count in digital form and including second memory digital counter means;
- means for varying the count in said second memory counter means;
- means for coupling the count state of said second memory counter means to said pulse source as said digital input for varying the frequency thereof; and
- means for coupling said pulse source to said first memory means for varying the count in said first memory counter means.

5. In a device for simulating radar range or the like by providing a controlled delay between an input trigger and an output pulse, the combination of:
- means for generating an output pulse at a predetermined period of time after receiving an input trigger and including delay digital counter means with said predetermined period being a function of the preset state of said delay counter means;
- first memory means for storing a count in digital form and including first bidirectional memory digital counter means;
- reset means for presetting said delay counter means to the count in said first memory counter means after generation of an output pulse;
- means for setting the count in said first memory counter means to an initial count;
- a pulse source for producing pulses at a controlled frequency as a function of a digital input;
- second memory means for storing a count in digital form and including second bidirectional memory digital counter means;
- means for varying the count in said second memory counter means;
- means for coupling the count state of said second memory counter means to said pulse source as said digital input for varying the frequency thereof;
- means for coupling said pulse source to said first memory means for varying the count in said first memory counter means; and
- first and second reverse means for selecting the direction of count variation in said first and second memory counter means, respectively.

6. In a device for simulating radar range or the like by providing a controlled delay between an input trigger and an output pulse, the combination of:
- means for generating an output pulse at a predetermined period of time after receiving an input trigger and including delay digital counter means with said predetermined period being a function of the preset state of said delay counter means;
- first memory means for storing a count in digital form and including first memory digital counter means;
- reset means for presetting said delay counter means to the count in said first memory counter means after generation of an output pulse;
- means for setting the count in said first memory counter means to an initial count;
- a pulse source for producing pulses at a controlled frequency as a function of a digital input;
- second memory means for storing a count in digital form and including second memory digital counter means;
- means for varying the count in said second memory counter means;
- means for coupling the count state of said second memory counter means to said pulse source as said digital input for varying the frequency thereof;
- a gate having an on condition for coupling said pulse source to said first memory means for varying the count in said first memory counter means and having an off condition for blocking said pulse source from said first memory means;
- means for applying a start signal to said gate for switching said gate to said on condition;
- coincidence means having first and second digital inputs, with said first input having a predetermined value, and with said coincidence means providing an output for switching said gate to said off condition when said inputs coincide; and
- means for coupling the count state of said first memory counter means to said coincidence means as said second input.

7. In a device for simulating radar range or the like by providing a controlled delay between an input trigger and an output pulse, the combination of:
- an oscillator having means for starting upon receipt of a trigger input and means for stopping upon receipt of an output pulse;
- delay digital counter means having the output of said oscillator as an input for counting a preset number of oscillator pulses;
- memory means for storing a count in digital form and including memory digital counter means;
- reset means for presetting said delay counter means to the count in said memory counter means after generation of an output pulse; and
- gate means for coupling a pulse to the device output as the output pulse when said delay counter means completes said preset count.

8. In a device for simulating radar range or the like by providing a controlled delay between an input trigger and an output pulse, the combination of:
- an oscillator having means for starting upon receipt of a trigger input and means for stopping upon receipt of an output pulse;
- delay digital counter means having the output of said oscillator as an input for counting a preset number of oscillator pulses;
- a digitally settable variable delay line;

memory means for storing a count in digital form and including memory digital counter means;

reset means for presetting said delay counter means to the count in said memory counter means after generation of an output pulse;

means for varying the count in said memory counter means; and a gate for coupling a pulse as an input to said delay line when said delay counter means completes said preset count with the output of said delay line providing the output pulse.

9. In a device for simulating radar range or the like by providing a controlled delay between an input trigger and an output pulse, the combination of:

means for generating an output pulse at a predetermined period of time after receiving an input trigger and including delay digital counter means with said predetermined period being a function of the preset state of said delay counter means;

first memory means for storing a count in digital form and including first memory digital counter means;

reset means for presetting said delay counter means to the count in said first memory counter means after generation of an output pulse;

means for setting the count in said first memory counter means to an initial count;

a first pulse source for producing pulses at a controlled frequency as a function of a digital input;

second memory means for storing a count in digital form and including second memory digital counter means;

means for setting the count in said second memory counter means to an initial count;

a second pulse source;

means for coupling said second pulse source to said second memory means for varying the count in said second memory counter means;

means for coupling the count state of said second memory counter means to said first pulse source as said digital input for varying the frequency thereof; and means for coupling said first pulse source to said first memory means for varying the count in said first memory counter means.

References Cited

UNITED STATES PATENTS 2,904,752  9/1959  Perzley.

RODNEY D. BENNETT, *Primary Examiner.*

CHESTER L. JUSTUS, *Examiner.*

T. H. TUBBESING, *Assistant Examiner.*